(12) United States Patent
Szczap

(10) Patent No.: US 8,876,928 B2
(45) Date of Patent: Nov. 4, 2014

(54) AUTOMATIC FLOW BLOCKING SYSTEM FOR REVERSE PULSE FILTER CLEANING

(75) Inventor: Joseph P. Szczap, Naperville, IL (US)

(73) Assignee: Spraying Systems Co., Wheaton, IL (US)

( * ) Notice: Subject to any disclaimer, the term of this patent is extended or adjusted under 35 U.S.C. 154(b) by 201 days.

(21) Appl. No.: 13/582,371

(22) PCT Filed: Mar. 10, 2011

(86) PCT No.: PCT/US2011/027918
§ 371 (c)(1),
(2), (4) Date: Nov. 7, 2012

(87) PCT Pub. No.: WO2011/112819
PCT Pub. Date: Sep. 15, 2011

(65) Prior Publication Data
US 2013/0206008 A1    Aug. 15, 2013

Related U.S. Application Data

(60) Provisional application No. 61/312,535, filed on Mar. 10, 2010.

(51) Int. Cl.
*B01D 46/04* (2006.01)
*B01D 46/00* (2006.01)

(52) U.S. Cl.
CPC .................................. *B01D 46/0068* (2013.01)
USPC .................................. 55/287; 55/288; 55/302

(58) Field of Classification Search
USPC .......... 55/294, 302, 295, 296, 297, 298, 293, 55/300, 303; 95/278, 279, 280; 15/304, 15/321, 352; 210/391, 393, 394
See application file for complete search history.

(56) References Cited

U.S. PATENT DOCUMENTS

| 4,826,512 | A |   | 5/1989 | Fuller |   |
|---|---|---|---|---|---|
| 5,178,652 | A | * | 1/1993 | Huttlin | 95/279 |
| 5,565,912 | A | * | 10/1996 | Easterly et al. | 348/96 |
| 5,868,807 | A |   | 2/1999 | Luy et al. |   |
| 6,736,881 | B2 | * | 5/2004 | Leibold et al. | 95/280 |
| 7,815,701 | B2 | * | 10/2010 | Grieve | 55/294 |
| 8,048,207 | B1 | * | 11/2011 | Streichsbier et al. | 95/279 |

(Continued)

OTHER PUBLICATIONS

United States Patent and Trademark Office, International Search Report in the International Patent Application No. PCT/US11/27918 (May 3, 2011).

*Primary Examiner* — Duane Smith
*Assistant Examiner* — Mihn-Chau Pham
(74) *Attorney, Agent, or Firm* — Leydig, Voit & Mayer, Ltd.

(57) ABSTRACT

A powder processing system having a processing vessel into which powder is pneumatically supplied and an exhaust plenum that communicates with the processing vessel through an exhaust port. A filter is located at the exhaust port for filtering air borne powder from the air flow exiting the processing vessel, and a reverse pulse air filtering device is provided for selectively removing accumulated powder from the filter. The cleaning device includes a nozzle having a first portion within the air plenum and a second portion within the air filter, and a plunger is mounted on the first filter portion for movement to an exhaust port closing position as an incident to the direction of pressurized air through the first portion of the nozzle for enabling pressurized air from the second portion of the nozzle to thereupon be directed through the filter without hindrance of air exiting the processing vessel.

3 Claims, 4 Drawing Sheets

(56) References Cited

U.S. PATENT DOCUMENTS

| | | | |
|---|---|---|---|
| 8,114,196 B2 * | 2/2012 | Lamee | 95/280 |
| 8,382,870 B2 * | 2/2013 | Troxell et al. | 55/302 |
| 2005/0252178 A1 * | 11/2005 | Richard | 55/302 |
| 2009/0291157 A1 | 11/2009 | Consoli et al. | |

* cited by examiner

ID_1  US 8,876,928 B2

AUTOMATIC FLOW BLOCKING SYSTEM FOR REVERSE PULSE FILTER CLEANING

CROSS-REFERENCE TO RELATED APPLICATIONS

This patent application claims the benefit of U.S. Provisional Patent Application No. 61/312,535, filed Mar. 10, 2010, which is incorporated by reference.

FIELD OF THE INVENTION

The present invention relates generally to fluid bed coaters, dryers, granulators, and other processing equipment in which airborne particles must be separated from an air stream by means of one or more filter elements for retaining and collecting the particles to prevent them from entering the atmosphere or other process vessels. More particularly, the invention relates to a reverse pulse filter cleaning system for removing particulate matter that has accumulated on the filter element by means of periodic pulses of compressed air.

BACKGROUND OF THE INVENTION

In conventional fluid bed processing equipment 10 of the foregoing type, as depicted in FIG. 1, one or more filter elements 11 are used to separate and collect airborne particles discharging from a process vessel 12 into an exhaust plenum 15. Air initially latent with particles may only flow from the process vessel 12 to the exhaust plenum 15 through the filter element 11. Over time the particulate accumulates on the filter element 11 restricting the flow of air from the process vessel to the exhaust plenum preventing effective processing. Periodically the filter must be cleaned by knocking the particulate accumulation off of the retaining filter element 11. Commonly a nozzle 16 is arranged at the point where the filter element 11 terminates into the exhaust plenum 15. The inlet end of the nozzle 16 is connected to a high compressed air source 18 that is controlled by a quick acting valve. When the valve is momentarily actuated, a pulse of air is released from the compressed air source 18 and travels down the nozzle 16 toward the retaining filter 11. The burst of compressed air temporarily reverses the flow of air from the process vessel 12 to the exhaust plenum 15 and redirects the air so that it then moves from the compressed air source into the process vessel. A venturi effect 19 occurs if the nozzle 16 is properly positioned for also drawing air from the exhaust plenum into the process vessel along with the compressed air. This sudden pulse of air acting in the reverse direction serves to dislodge the accumulated particulate from the face of the filter 11 on the process side. The particulate drops off of the retaining filter 11 and returns to the process vessel 12 for further processing or collection.

In many instances, the process occurring does not allow the flow of air to be stopped from the process vessel to the exhaust plenum. This hampers the cleaning and often makes the reverse pulse method of filter cleaning ineffective. This can occur for several reasons, but is normally attributed to the size the particles being cleaned, the frequency by which the filter can be cleaned, improper positioning and sizing of the compressed air nozzle, and an excessive air velocity across the filter element. When this occurs, a large differential pressure can be created between the process vessel and the exhaust plenum. This large pressure differential hinders the venturi effect that draws air from the exhaust plenum and reduces the effectiveness of the air pulse. Rather than dislodging the accumulated particulate from the retaining filter, the air takes the path of least resistance with most of the air traveling into the exhaust plenum and only a small amount traveling into the process vessel with a force too weak to dislodge accumulated material from the filter.

Attempts to overcome the foregoing problems have included increasing the frequency of cleanings, increasing the pulse duration, increasing the pulse force by increasing the pressure of compressed air source, increasing the number of retaining filter elements, or combining this method with mechanical filter cleaning. Often these methods are impractical to implement and reduce efficiency of the process.

OBJECTS AND SUMMARY OF THE INVENTION

It is an object of the present invention to provide a process vessel having a reverse pulse air filter cleaning system adapted for more reliable operation.

Another object is to provide a processing vessel as characterized above in which the reverse pulse air filter cleaning system is operable for automatically interrupting the flow of air from the process vessel to an exhaust plenum during the filter cleaning cycle of operation.

A further object is to provide a process vessel having a reverse pulse air filter cleaning system of the above kind which is effective for sealing off the air plenum during the filter cleaning cycle.

Yet another object is to provide a process vessel having a reverse pulse air filter cleaning system which is adapted for more uniformly cleaning the filter element.

Still a further object is to provide such a process vessel with a reverse pulse air filter cleaning system that is relatively simple in construction and reliable in operation.

Other objects and advantages of the invention will become apparent upon reading the following detailed description and upon reference to the drawings, in which:

Figure 1:
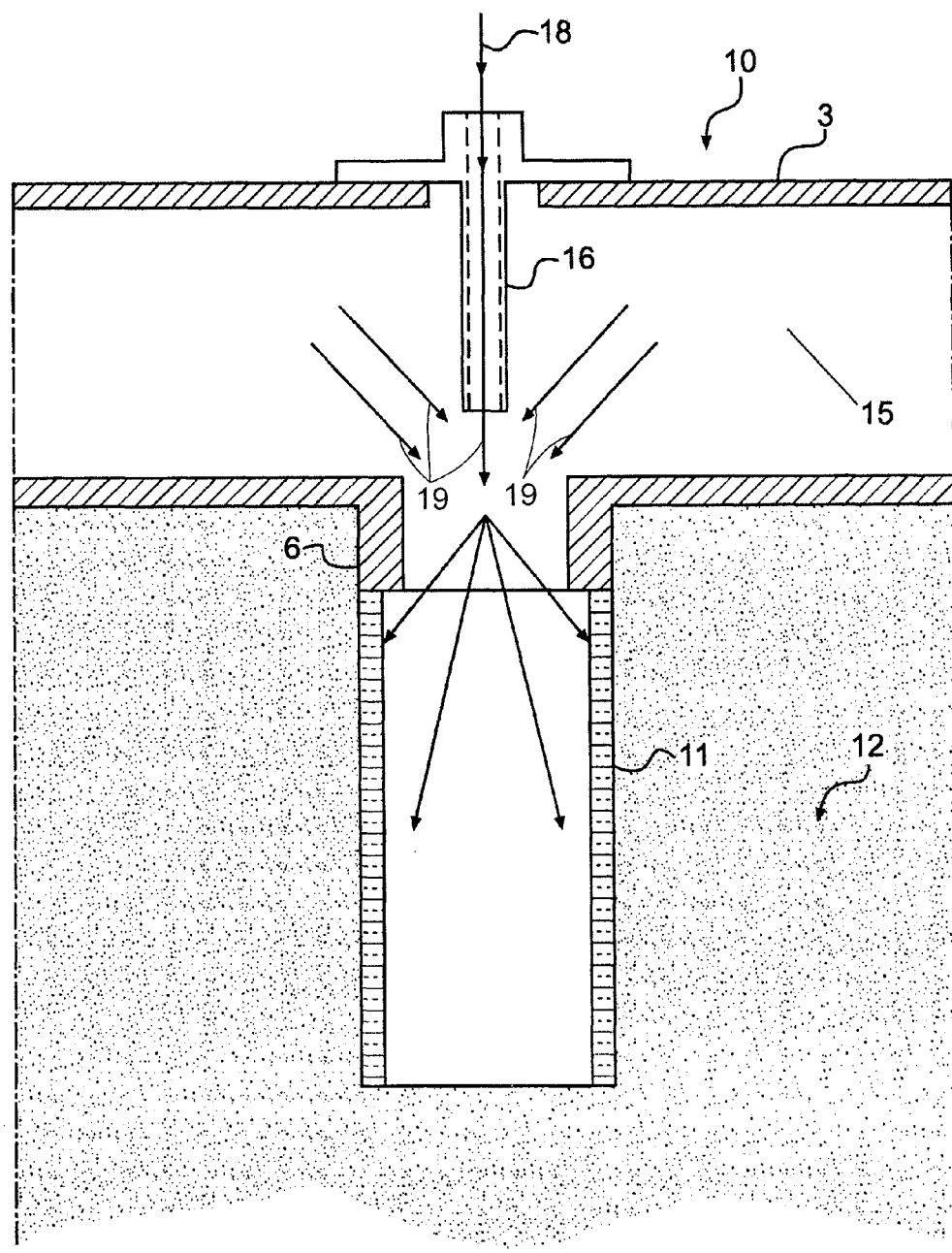
FIG. 1 is a fragmentary section of a process vessel having a conventional reverse pulse air filter cleaning device.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Figure 2:
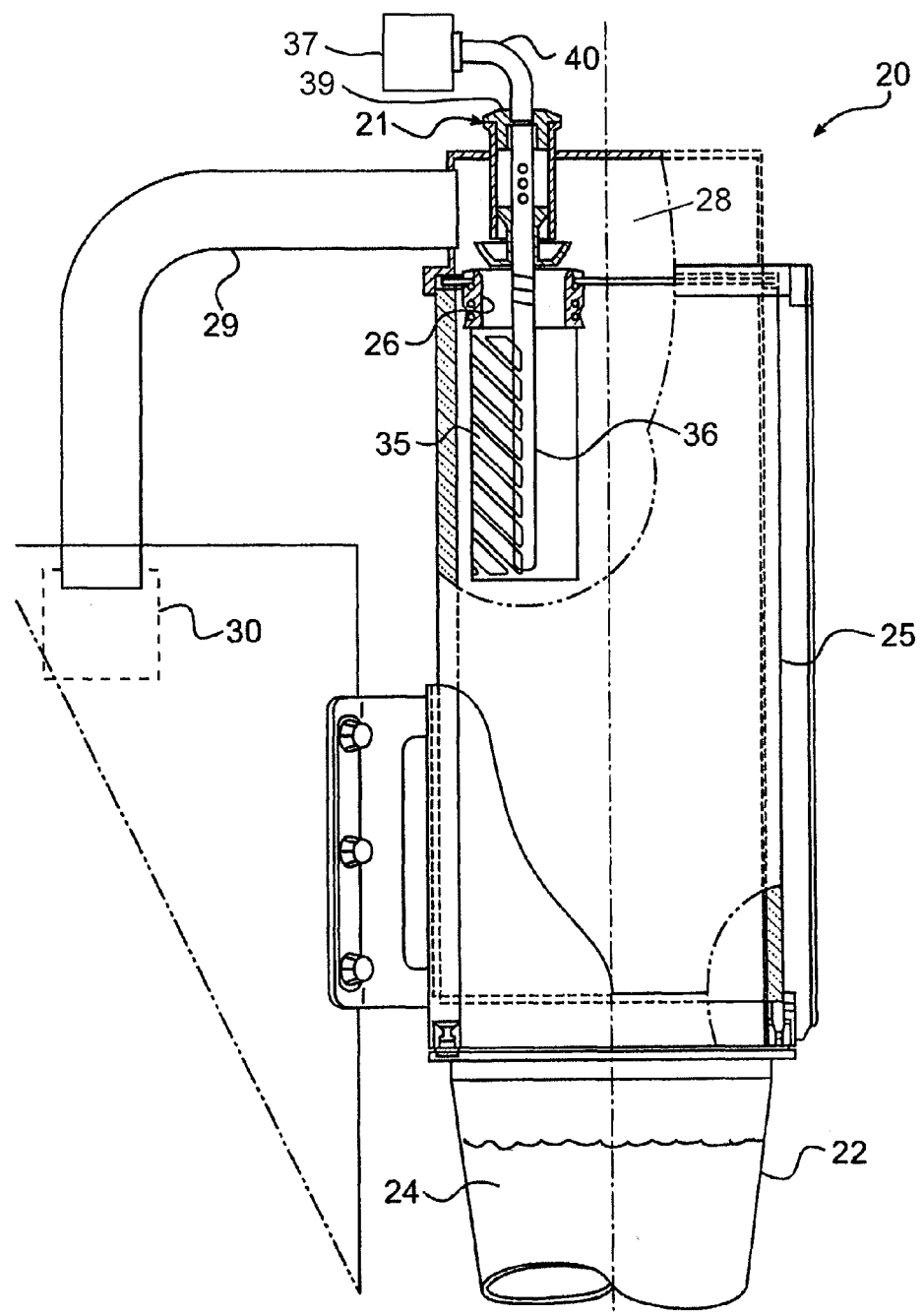
FIG. 2 is a vertical section of an illustrative fluid bed coating apparatus having a process vessel with a reverse pulse air filter cleaning device in accordance with the invention.
Figure 3:
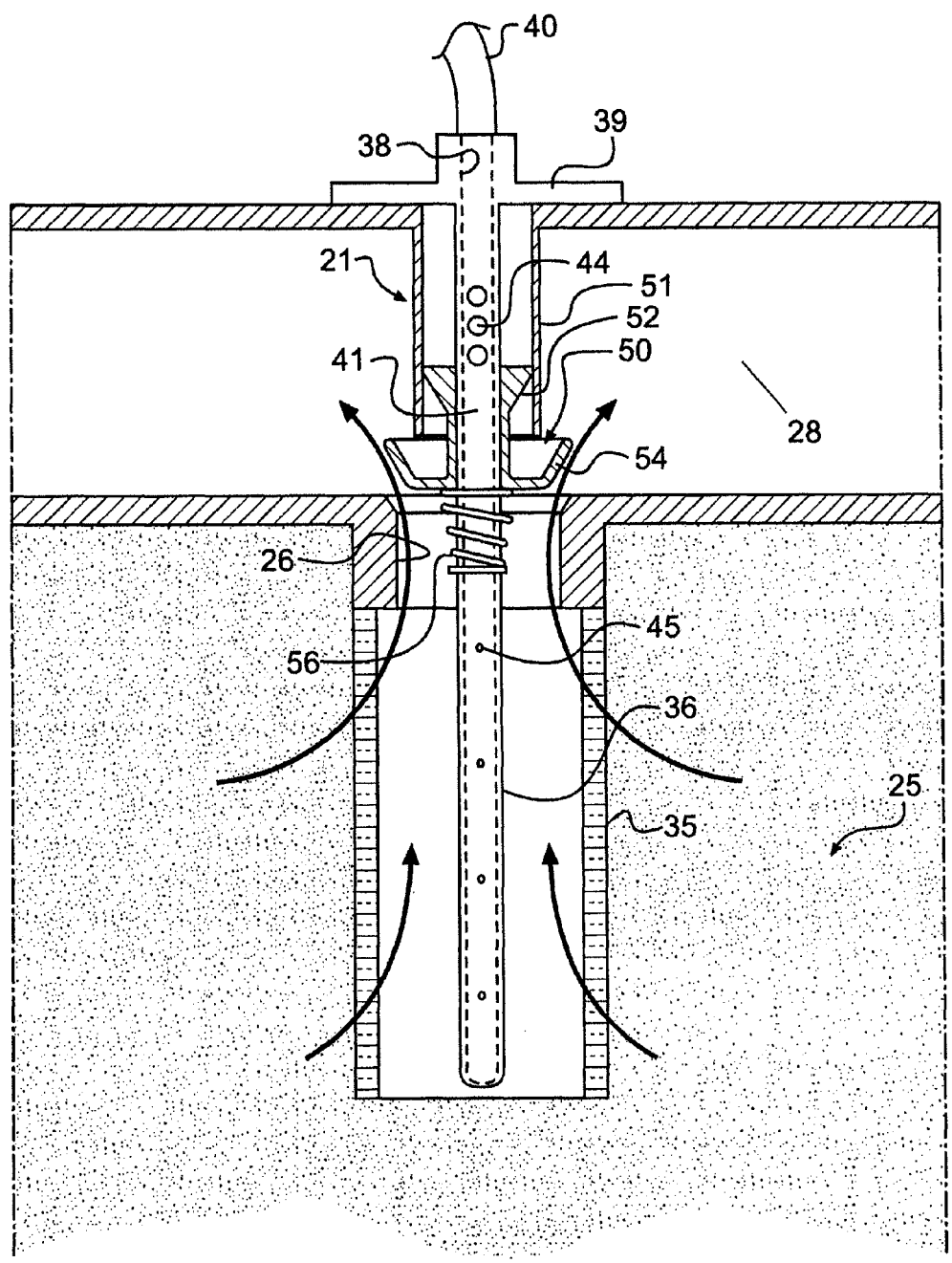
FIG. 3 is an enlarged fragmentary diagrammatic section of the process vessel of the illustrated apparatus showing the reverse pulse air filter cleaning device in an inoperative state.
Figure 4:
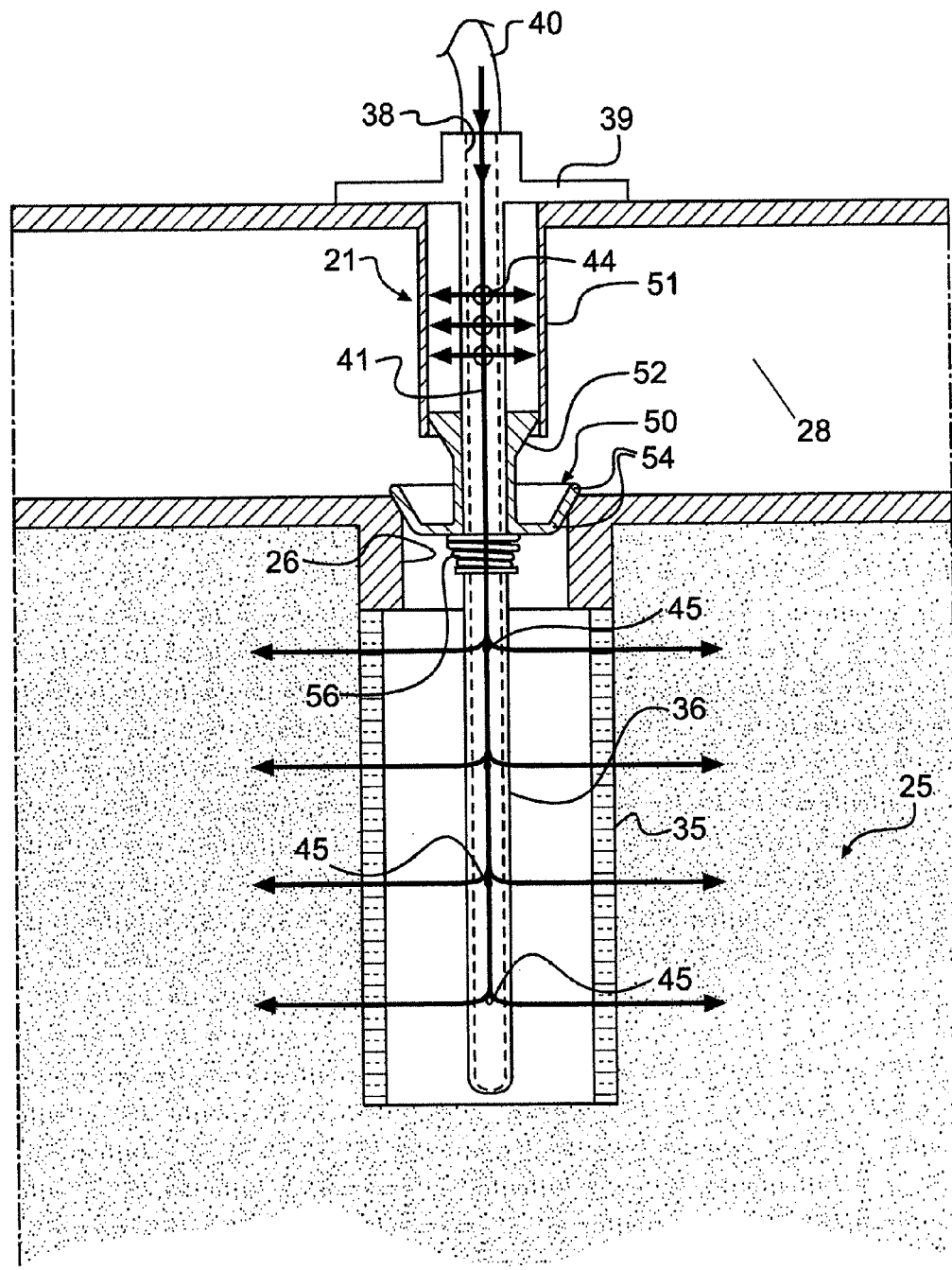
FIG. 4 is an enlarged fragmentary diagrammatic section, similar to FIG. 3, showing the reverse pulse air filter cleaning device in an operating condition.

Referring now more particularly to FIGS. 2-4 of the drawings, there is shown an illustrative fluid bed dryer 20 having a reverse pulse air filter cleaning device 21 in accordance with the invention. It will be understood that the fluid bed dryer 20 may be part of any of various types of known processing systems. The illustrated fluid bed dryer 20 includes an upwardly and outwardly opening bowl 22 which contains a bed of powder 24 and which communicates with an air inlet plenum from its underside. The powder containing bowl 22 is mounted in underlying relation to a process vessel 25 which has an exhaust port 26 at an upper end communicating with an exhaust plenum 28, which in turn communicates with a downwardly angled exhaust pipe 29. As it is known in the art, a blower 30 coupled to the exhaust pipe 29 can be operated to draw a negative pressure through the exhaust plenum 28, process vessel 25, and bowl 22 for drawing air upwardly through the bed of powder 24 for purposes of drying or otherwise processing the powder.

For filtering airborne particles from the air stream exiting the process vessel 25 into the exhaust plenum 28, an annular air filter 35 of a known type is fixed in depending relation to the exhaust port 26. As the process air flows from the process vessel 25 to the exhaust plenum 28, the operating pressure in the exhaust plenum 28 remains lower than the pressure within the process vessel 25. As the process continues, airborne particulate matter within the process vessel 25 accumulate on the filter 35 and requires removal for continued efficient operation.

In accordance with the invention, the reverse pulse air filter cleaning device is adapted to sequentially direct a pulse of compressed air through the filter without hindrance from the flow of process air from the process vessel to the exhaust plenum for more effectively dislodging and removing retained particulate matter about the filter. More particularly, the reverse pulse air filter cleaning device is operable for simultaneously sealing the exhaust plenum from the process vessel while directing the pulse of compressed air during the filter cleaning operation. In the illustrated embodiment, the reverse pulse air filter cleaning device 21 includes a reverse pulse nozzle 36 having an air inlet 38 at an upper end, as viewed in FIG. 3, at an upper wall of the exhaust plenum 28 fixed by an annular retainer 39 for connection to a compressed air supply line 40 coupled to a pressurized air source 37. As will be understood by one skilled in the art, compressed air may be selectively or cyclically directed to the nozzle inlet 38 under the control of a suitable control valve. The nozzle 36 in this case has a cylindrical closed bottom construction which defines a hollow inner air passageway 41 extending from the inlet 38 through the exhaust plenum 28 and substantially the length of the filter 35. The nozzle 36 is formed with a plurality of relatively large diameter discharge holes 44 in a section within the exhaust plenum 28 and a plurality of smaller sized air discharge holes 45 in the length of the nozzle 36 within the filter 35.

In keeping with the invention, for interrupting the flow of process air from the process vessel 25 to the exhaust plenum 28 during operation of the reverse pulse nozzle 36, an annular exhaust port cut off plunger 50 is disposed about the reverse pulse nozzle 36 for axial movement within the exhaust plenum 28, between exhaust port opening and closing positions. For controlling movement of the plunger 50, a bottom opening plunger cylinder 51 is mounted in sealed depending relation from the upper wall of the exhaust plenum 28. The illustrated plunger 50 includes an upper relatively small diameter annular sealing and guide flange 52 having an outer perimeter adapted for sliding sealing engagement with the interior of the cylinder 51 and a lower larger diameter valve head 54 disposed below the lower terminal end of the cylinder 51 for sealing engagement with the process vessel exhaust port 26. The plunger 50 preferably is made of a resilient material, and the upper sealing and guide flange 52 and lower valve head 54 have downwardly tapered or cup shaped configurations.

The plunger 50 is disposed for limited axial movement along the reverse pulse nozzle 36 and is biased to a normally open or retracted position, as shown in FIG. 3, by coil spring 56 fixed about the outer perimeter of the reverse pulse nozzle 36. With the valve plunger 50 biased to such position, process air flows from the process vessel 25 through the filter 35, exhaust port 26 and into the exhaust plenum 28.

During a reverse pulse air cleaning cycle, a pulse of compressed air is directed through the reverse pulse nozzle 36 from the inlet line 40. As the compressed air travels through the nozzle 36, it first is directed through the larger diameter or plunger actuation holes 44 into the plunger cylinder 51 above the plunger sealing and guide flange 52 and then though the smaller reverse pulse nozzle holes 45. Since the larger holes 44 provide the path of less resistance, air first flows into the plunger cylinder 51 and as pressure in the plunger cylinder 51 increases, it forces the plunger 50 downwardly against the biasing force of the spring 56. Eventually, the pressure builds to a point where it overcomes the force of the spring 56 and forces the plunger 50 downwardly toward the exhaust port 26 temporarily sealing it off. After the plunger 50 seals the exhaust port 26 the compressed air in the outer plunger cylinder 51 can no longer displace the plunger 50 and air pressure in the plunger cylinder 51 increases to a point that the compressed air is then forced through the smaller nozzle holes 45 and against the filter 35 for dislodging build up particulate matter about its outside surface. It will be understood that cleaning of the filter 35 can be effectively and efficiently carried out since the plunger 50 has sealed the process vessel exhaust port 26 preventing the flow of process air through the filter 35 and equalizing the pressure on both sides of the filter 35. Accordingly, the compressed air pulse does not need to counteract the flow of process air which can otherwise impede or prevent its cleaning effectiveness. As a result, even at lower pressures, such arrangement enables more effective utilization of the reverse compressed air pulse.

Following the reverse compressed air pulse and the dislodgement of the accumulated particulate on the filter, pressure will dissipate within the plunger cylinder 51 to the extent that it will no longer counteract the spring 56. The plunger 50 then will move upwardly under the force of the spring 56 to its retracted or rest position, unsealing the exhaust port 26 for continued operation of the dryer 10.

From the foregoing, it can be seen that the reverse pulse air filter cleaning device is adapted for more efficient and reliable operation, by automatically interrupting the flow of process air from the process vessel to an exhaust plenum during the filter cleaning cycle which can otherwise impede the effectiveness of the reverse compressed air pulse.

The invention claimed is:

1. A powder processing system comprising:
a processing vessel,
a supply of powder from which powder is pneumatically supplied to said processing vessel,
an exhaust plenum,
said processing vessel having an exhaust port for communicating air from said processing vessel to said exhaust plenum,
a filter having an annular construction disposed within said processing vessel for filtering powder from air communicating through said exhaust port from said processing vessel to said exhaust plenum,
a reverse pulse air filter cleaning device having a selectively operable nozzle coupled to a pressurized air source for directing pressurized air from said nozzle through said filter and into said processing vessel for dislodging powder accumulated on said filter from air passing through the filter, a plunger mounted for movement between an exhaust port open position that permits the flow of air from said processing vessel through said exhaust port and to said exhaust plenum and an exhaust port closing position that interrupts and prevents the flow of air from said processing vessel through said exhaust port, said plunger being movable from said exhaust port open position to said exhaust port closing position as an incident to the direction of pressurized air through said nozzle for enabling pressurized air from said nozzle to thereupon be directed through said filter and into the processing vessel without the flow of air from said processing vessel through said exhaust port and into said exhaust plenum, said nozzle having a hollow construction through which pressurized air is directed, said nozzle having a first portion disposed within said exhaust plenum and a second portion disposed within and extending substantially the length of said annular filter, said plunger being supported for movement along said first portion of said nozzle, a plunger cylinder disposed concentrically about the first portion of said nozzle, said plunger having an annular guide flange for sliding sealing contact with said guide cylinder during movement of said plunger between said exhaust port open and closing positions, said plunger having a valve head for engaging and closing said exhaust port when said plunger is in said exhaust port closing position, said nozzle first portion being formed with a plurality of apertures for permitting communication of pressurized air from said nozzle and into said plunger cylinder for moving said plunger to said valve closing position, said nozzle second portion being formed with a plurality of apertures along the length of said portion for permitting the flow of pressurized air from said nozzle through said filter and into said processing vessel, said apertures in said first portion being larger in size than the apertures in said second portion such that when pressurized air is directed to said nozzle it communicates through the larger apertures in the first portion for first forcing the plunger downwardly to said exhaust port closing position and which thereafter increases pressure within the second portion sufficient for directing air through the apertures of the second portion against the filter for dislodging buildup of particulate matter about the outside of the filter, and said plunger being movable from said exhaust port closing position to said exhaust port open position as an incident to the interruption in the supply of pressurized air to said nozzle.

2. The processing system of claim 1 including a spring for biasing said plunger in a direction toward said exhaust port opening position.

3. The processing system of claim 1 including a blower for drawing an air flow from said processing vessel through said exhaust port and into an exhaust plenum.

* * * * *